(12) United States Patent
Gustafsson et al.

(10) Patent No.: US 6,416,860 B1
(45) Date of Patent: Jul. 9, 2002

(54) ELECTRIC CABLE AND A METHOD AND COMPOSITION FOR THE PRODUCTION THEREOF

(75) Inventors: Bill Gustafsson; Ola Fagrell, both of Stenungsund (SE)

(73) Assignee: Borealis A/S, Lyngby (DK)

(*) Notice: Subject to any disclaimer, the term of this patent is extended or adjusted under 35 U.S.C. 154(b) by 0 days.

(21) Appl. No.: 09/534,669

(22) Filed: Mar. 24, 2000

Related U.S. Application Data

(63) Continuation of application No. PCT/SE98/01786, filed on Oct. 5, 1998.

(30) Foreign Application Priority Data

Oct. 20, 1997 (SE) .............................. 9703798

(51) Int. Cl.$^7$ ............................ B32B 15/08; H01B 1/24; H01B 7/00
(52) U.S. Cl. ........................ 428/383; 428/372; 428/379; 252/511; 174/105 SC; 174/110 PM; 174/120 SC
(58) Field of Search ...................... 252/511; 428/372, 428/379, 383; 174/120 SC, 105 SC, 110 PM

(56) References Cited

U.S. PATENT DOCUMENTS

| | | | |
|---|---|---|---|
| 3,646,155 A | | 2/1972 | Scott |
| 3,749,629 A | | 7/1973 | Andrews et al. |
| 4,117,195 A | | 9/1978 | Swarbrick et al. |
| 4,246,412 A | * | 1/1981 | Ongchin ............... 252/511 |
| 4,275,180 A | * | 6/1981 | Clarke ................. 525/173 |
| 4,286,023 A | | 8/1981 | Ongchin |
| 4,297,310 A | | 10/1981 | Akutsu et al. |
| 4,351,876 A | | 9/1982 | Doi et al. |
| 4,397,981 A | | 8/1983 | Doi et al. |
| 4,413,066 A | | 11/1983 | Isaka et al. |
| 4,446,283 A | | 5/1984 | Doi et al. |
| 4,451,536 A | * | 5/1984 | Barlow et al. ............ 428/383 |
| 4,456,704 A | | 6/1984 | Fukumara et al. |
| 4,547,551 A | | 10/1985 | Bailey et al. |
| 4,576,993 A | | 3/1986 | Tamplin et al. |
| 4,588,855 A | * | 5/1986 | Kutsuwa et al. ...... 174/120 SC |
| 4,795,482 A | | 1/1989 | Gioffre et al. |
| 4,812,505 A | | 3/1989 | Topcik |
| 4,909,960 A | * | 3/1990 | Watanabe et al. .......... 252/511 |
| 4,970,278 A | | 11/1990 | Komabashiri et al. |
| 5,047,468 A | | 9/1991 | Lee et al. |
| 5,149,738 A | | 9/1992 | Lee et al. |
| 5,380,803 A | | 1/1995 | Coutant et al. |
| 5,382,631 A | | 1/1995 | Stehling et al. |
| 5,420,185 A | * | 5/1995 | Watanabe et al. .......... 524/210 |

(List continued on next page.)

FOREIGN PATENT DOCUMENTS

| | | |
|---|---|---|
| EP | 0 040 992 B1 | 5/1984 |
| EP | 0 041 796 B1 | 8/1984 |
| EP | 0 207 627 A2 | 1/1987 |
| EP | 0 207 627 A3 | 1/1987 |
| EP | 0 022 376 B1 | 3/1987 |
| EP | 0 214 099 A2 | 3/1987 |
| EP | 0 237 294 A2 | 9/1987 |
| EP | 0 318 841 A2 | 6/1989 |
| EP | 0 334 993 | 10/1989 |
| EP | 0 348 978 A2 | 1/1990 |
| EP | 0 369 436 A2 | 5/1990 |
| EP | 0 193 317 B1 | 9/1990 |
| EP | 0 401 540 A2 | 12/1990 |
| EP | 0 460 936 A1 | 12/1991 |
| EP | 0 475 064 A1 | 3/1992 |

(List continued on next page.)

OTHER PUBLICATIONS

Derwent Abstract ACC–NO 1999–302726, 1999.*
Derwent Abstract ACC–NO 1989–002856, 1999.*
JP 2–235740 abstract. Jujo Paper Co Ltd, Sep. 18, 1990, abstract, figure 1. Japan, vol. 14, No. 552, M–1056.
JP 06340036 A abstract. Goyo PaperWorking Co Ltd, Dec. 13, 1994. Japan, vol. 94, No. 12.
JP 01100803 A2 abstract. STN International, File CAPLUS, CAPLUS accession No. 1989:555983, Doc. No. 111:155983, Hitachi Cable, Ltd.: "Hindered amine–containing crosslinked polyethylene electric insulators for cables and wires": Apr. 19, 1989.
JP 56065667 A abstract. Jun. 3, 1981.
WPI, Derwent Accession No. 90–326069, Jujo Paper MFG KK: "Blank for paper container for food packaging—comprises paper board, thermoplastic layer laminated for outside of container and two resin layers contain deodorise;" & JP A 2235740, 900918.+
WPI, Derwent accession No. 77–85827Y, Sumitomo Chem Co. Ltd: "Straight chain ethylene copolymers preparation copolymerise ethylene, glycol mono–acrylate and ethylenically unsaturated monomer," JP A 52126495, 441024, DW7748.
Saikkonin, Mikka. "Extrusion of slotted core elements," *Wire Technology International*, Nov. 1995.
Williams et al., Polymer Letters, vol. 6, pp. 621–624 (1968).

*Primary Examiner*—Cynthia H. Kelly
*Assistant Examiner*—J. M. Gray
(74) *Attorney, Agent, or Firm*—Merchant & Gould P.C.

(57) ABSTRACT

A semiconducting composition for the inner semiconducting layer of an electric cable, an electric cable incorporating the composition, and a method of producing a cross-linked inner semiconducting layer of an electric cable are disclosed. The semiconducting composition comprises, based on the total weight of the composition, (a) 30–90% by weight of an ethylene copolymer, (b) carbon black in an amount at least sufficient to make the composition semiconducting, (c) 0–8% by weight of a peroxide cross-linking agent, (d) 0–8% by weight of conventional additives, characterized in that said ethylene copolymer (a) is an ethylene-methyl (meth) acrylate copolymer, preferably comprising 5–25% by weight of methyl(meth)acrylate, based on the weight of the copolymer.

7 Claims, No Drawings

U.S. PATENT DOCUMENTS

| | | | |
|---|---|---|---|
| 5,453,322 A | | 9/1995 | Keogh et al. |
| 5,459,187 A | | 10/1995 | Taylor et al. |
| 5,521,264 A | | 5/1996 | Mehra et al. |
| 5,534,572 A | | 7/1996 | Taylor et al. |
| 5,550,193 A | | 8/1996 | Chiu et al. |
| 5,574,816 A | | 11/1996 | Yang et al. |
| 5,580,493 A | | 12/1996 | Chu et al. |
| 5,582,923 A | | 12/1996 | Kale et al. |
| 5,718,082 A | | 2/1998 | Kmiec |
| 5,719,218 A | | 2/1998 | Sarma |
| 5,731,082 A | | 3/1998 | Gross et al. |
| 5,736,258 A | | 4/1998 | Moy |
| 5,798,427 A | | 8/1998 | Foster et al. |
| 5,807,635 A | | 9/1998 | Cogen et al. |
| 5,871,706 A | * | 2/1999 | Whitehouse ............. 423/449.2 |
| 5,891,979 A | | 4/1999 | Dammert et al. |
| 5,911,023 A | | 6/1999 | Risch et al. |
| 5,985,181 A | * | 11/1999 | Yoshida et al. ............. 252/511 |
| 6,013,202 A | * | 1/2000 | Easter et al. ................. 252/511 |
| 6,080,810 A | * | 6/2000 | Ribarits et al. ............. 524/496 |

FOREIGN PATENT DOCUMENTS

| | | | |
|---|---|---|---|
| EP | 0 497 530 A2 | | 8/1992 |
| EP | 0 533 160 A1 | | 3/1993 |
| EP | 0 535 230 A1 | | 4/1993 |
| EP | 0 538 033 A1 | | 4/1993 |
| EP | 0 540 075 A1 | | 5/1993 |
| EP | 0 420 271 B1 | | 12/1994 |
| EP | 0 517 868 B1 | | 11/1995 |
| EP | 0 688 794 A1 | | 12/1995 |
| EP | 0 750 319 A1 | | 12/1996 |
| FI | 980788 | | 4/1998 |
| GB | 942369 | | 11/1963 |
| GB | 2 028 831 A | | 3/1980 |
| JP | 363279503 | * | 11/1987 |
| JP | 63-279503 | | 11/1988 |
| JP | 353509/1992 | | 12/1992 |
| WO | WO 91/09075 | | 6/1991 |
| WO | WO 92/12182 | | 7/1992 |
| WO | WO 92/13029 | | 8/1992 |
| WO | WO 95/10548 | | 4/1995 |
| WO | WO 97/03124 | | 1/1997 |

* cited by examiner

ELECTRIC CABLE AND A METHOD AND COMPOSITION FOR THE PRODUCTION THEREOF

This application is a continuation of international application number PCT/SE98/01786, filed Oct. 5, 1998.

FIELD OF THE INVENTION

The present invention relates to electric cables and particularly the invention relates to inner semiconducting layers of electric cables, preferably to cross-linked, inner semiconducting layers of electric cables, and to a method of producing same.

BACKGROUND OF THE INVENTION

Electric cables and particularly electric power cables for medium and high voltages are composed of a plurality of polymer layers extruded around the electric conductor. The electric conductor is usually coated first with an inner semiconducting layer followed by an insulating layer, then an outer semiconducting layer. To these layers further layers may be added, such as a water barrier layer and a sheath layer.

The insulating layer and the semiconducting layers normally consist of ethylene homo- and/or copolymers which preferably are cross-linked. LDPE (low density polyethylene, i.e. polyethylene prepared by radical polymerization at a high pressure) cross-linked by adding peroxide, for instance dicumyl peroxide, in connection with the extrusion of the cable, is today the predominant cable insulating material. The inner semiconducting layer normally comprises an ethylene copolymer, such as an ethylene-vinyl acetate copolymer (EVA). The composition of the outer semiconducting layer differs depending on whether it has to be strippable or not. Normally a strippable semiconducting layer comprises an ethylene copolymer, such as an ethylene-vinyl acetate copolymer (EVA) together with an acrylonitrile-butadiene rubber (NBR) and sufficient carbon black to make the composition semiconducting. A non-strippable (bonded), outer semiconducting layer may comprise EVA, EEA or EBA together with an amount of carbon black sufficient to make the composition semiconducting.

As an example of a strippable composition, mention may be made of EP-B1-0 420 271 which discloses a semiconducting insulation shielding composition for electric cables which, based on the total weight of the composition, consists essentially of (A) 40–64% by weight of an ethylene-vinyl acetate copolymer with 27–45% of vinyl acetate, (B) 5–30% by weight of an acrylonitrile-butadiene copolymer with 25–55% of acrylonitrile, (C) 25–45% by weight of carbon black having a surface area of 30–60 m$^2$/g, and (D) 0.2–5% by weight of an organic peroxide cross-linking agent. In addition the composition may include 0.05–3% by weight of conventional additives.

As a further example of prior art strippable semiconducting compositions for electric cables, mention may be made of U.S. Pat. No. 4,286,023 which discloses a polymer composition for electric cables comprising (A) an ethylene copolymer selected from the group consisting of ethylene-alkyl acrylate copolymers containing about 15–45% by weight of alkyl acrylate, said alkyl acrylate being selected from the group consisting of $C_1$–$C_8$ alkyl esters of (meth) acrylic acid, such as methyl acrylate, ethyl acrylate, methyl methacrylate, butyl acrylate, 2-ethyl-hexyl acrylate and the like, and ethylene-vinyl acetate copolymers containing about 15–45% by weight of vinyl acetate, (B) a butadiene-acrylonitrile copolymer (nitrile rubber) containing about 10–50% by weight of acrylo-nitrile, (C) conductive carbon black, and (D) a peroxide cross-linking agent, wherein the weight ratio A:B=1:9 to 9:1; C:(A+B)=0.1 to 1.5, and D is present in an amount of 0.2–5% by weight of the total composition.

It should be noted that U.S. Pat. No. 4,286,023 relates to strippable outer semiconducting layers. Inner semiconducting layers are not disclosed.

It should also be noted that ethylene-vinyl acetate copolymer is the preferred component (A) according to U.S. Pat. No. 4,286,023. If component (A) is selected from $C_1$–$C_8$ alkyl esters of acrylic acid and methacrylic acid, the preferred copolymer is ethylene-ethyl acrylate copolymer.

Besides being semiconducting it is often desired that the outer semiconducting layer is strippable from the other layers (i.e. the insulating layer) to facilitate the joining of two cable ends. This strippability is achieved by making the outer semiconducting layer more polar (e.g. with the aid of a polar polymer, such as EVA) than He underlying insulating layer and cross-linking the outer semiconducting layer. The strippability of the outer semiconducting layer from the insulating layer is also influenced by other factors such as e.g. the choice of carbon black in the semiconducting layer.

Although prior art compositions for semiconducting layers in electric cables are satisfactory for many applications, there is always a desire to improve their characteristics and eliminate or reduce any disadvantages they may have.

One disadvantage of EVA conventionally used in semiconducting layers is that at elevated temperatures, such as during compounding of the semiconducting composition, EVA starts to decompose and generate acetic acid at about 150° C. At the same time double-bonds are formed in the polymer chain. The acetic acid, which is very corrosive, especially at high temperatures, attacks the processing equipment and leads to an undesired corrosion thereof. To a certain extent this may be counteracted by making the equipment of special, corrosion-resistant materials which, however, are expensive and add to the investment cost for manufacturing the cable. The release of acetic acid is also a negative factor from an environmental point of view. Further, the formation of double-bonds in the polymer chain at the generation of acetic acid may lead to undesired cross-linking and gel formation.

Another disadvantage of EVA as a material for the semiconducting layers of electric cables manifests itself when cross-linking (vulcanising) cables. The cross-linking is usually conducted in an about 100–200 m long vulcanising tube, where cross-linking should take place as rapidly and completely as possible. For conventional cables having semiconducting EVA-containing layers, cross-linking is carried out at a temperature of about 260–300° C., preferably 270–285° C. A nitrogen-gas pressure of about 8–10 bar is applied in the vulcanising tube and contributes to the preventing of oxidation processes by keeping away the oxygen of the air and to reducing the formation of microcavities, so-called voids, in the polymer layers. As explained above in connection with compounding of EVA, the elevated temperature at the cross-linking of EVA also causes generation of acetic acid and gel formation. The more elevated temperature at the cross-linking step compared to the compounding step results in a correspondingly increased generation o: acetic acid and formation of gel. Besides having an obnoxious smell, the acetic acid generated means a loss of VA from the EVA-containing layer and, probably connected therewith, a reduced strippability when making cables with a strippable outer semiconducting EVA-containing layer. Further, the acetic acid released condenses in the vulcanising tube together with other volatile substances and forms a viscous sticky liquid at the bottom of the vulcanising tube. This liquid must be removed from the vulcanising tube as otherwise it tends to adhere to and contaminate the surface of the cable. This implies production stops and lower productivity.

A disadvantage of EEA and EBA as polymers for semiconducting layers of electric cables is that when heated to high temperatures they decompose and split off decomposition products. The main decomposition products of EEA are ethylene in gas form and carboxylic and anhydride groups on the EEA main chain. Similarly, the main decomposition products of EBA are butene in gas form and carboxylic and anhydride groups on the EBA main chain. Although the thermal stability of EEA and EBA is about 100° C. higher than that of EVA, thermal decomposition of EEA and EBA may occur at high temperature processing, such as the vulcanising of cables. The decomposition of EEA and EBA means that there remains less EEA and EBA in the semiconducting layer and consequently that the polarity of the layer is lowered. Further, the decomposition product that is split off from EEA and EBA in thermal decomposition constitutes a contamination which may give rise to undesired water-treeing.

Yet another problem with electric cables is the so-called "shrink-back" phenomenon. This problem is related to the fact that the metal conductor of the cable and the polymer coating layers of the cable shrink differently when cooled. After making the cable by extrusion and cross-linking of the polymer layers around the metal conductor as described earlier, the cable is cut into lengths of a suitable dimension and cooled to ambient temperature. Upon cooling the polymer layers of the cable shrink more than the metallic conductor. This shrinking decreases the diameter of the cable coating and also decreases its length along the cable. The last-mentioned lengthwise shrinking makes the metallic conductor protrude beyond the cable coating at both ends of the cable (the coating shrinks back from the metallic conductor). The shrink-back of the cable coating also depends on adhesion between the coating, more particularly the inner semiconducting layer, and the metal conductor. The better the adhesion between the inner semiconducting layer and the metal conductor, the smaller the shrink-back, because the increased friction to the conductor inhibits the relaxation of the polymer layer. EEA and EBA exhibit a relatively high amount of shrink-back compared to EVA due to poor adhesion to the conductor. It should be added that the shrink-back phenomenon is more pronounced for cables with a solid conductor than for cables with a stranded conductor due to the smaller area of contact between the metal and polymer in the first-mentioned case.

If one tries to overcome the shrink-back problem of EEA and EBA by increasing the amount of EA and BA, respectively, the mechanical characteristics of the EEA and EBA polymers deteriorate to an unacceptable degree. This explains why EEA and EBA have not replaced EVA as polymer for the inner semiconducting layer of electric cables with a solid conductor.

To sum up, EVA is normally used as polymer for semiconducting layers of electric cables, although it has poor thermal stability and decomposes with generation of acetic acid at high temperatures. EEA and EBA are generally used as polymers for bonded outer semiconducting layers only and not for inner semiconducting layers due to the above mentioned shring-back problem. Further, the thermal stability of EEA and EBA is less than optimal.

SUMMARY OF THE INVENTION

The present invention is based on the discovery that the above problems and disadvantages of the prior art inner semiconducting layers of electric cables are solved or alleviated by using an ethylene-methyl (meth)acrylate copolymer (EM(M)A) as the ethylene copolymer in the inner semiconducting layer. The terms "methyl (meth)acrylate" and "M(M)A" used herein refer to methyl acrylate (MA) as well as methyl methacrylate (MMA). Ethylene-methyl-(meth) acrylate copolymers are highly temperature stable and do not split off any decomposition products like acetic acid, ethylene or butene when processed at similar elevated temperatures.

Thus, the present invention provides an inner semiconducting composition for electric cables which, based on the total weight of the composition, comprises (a) 30–90% by weight of an ethylene copolymer, b) carbon black in an amount at least sufficient to make the composition semiconducting, (c) 0–8% by weight of a peroxide cross-linking agent, (d) 0–8% by weight of conventional additives, characterized in that the ethylene copolymer (a) is an ethylene-methyl (meth)-acrilate copolymer.

The present invention also provides an electric cable including a conductor which, in the order from inside and outwards, is surrounded by an inner semiconducting layer, an insulating layer, and an outer semiconducting layer, said inner semiconducting layer being derived from a semiconducting composition which, based on the total weight of the composition, comprises (a) 30–90% by weight of an ethylene copolymer, (b) carbon black in an amount at least sufficient to make the composition semiconducting, (c) 0–8% by weight of a peroxide cross-linking agent, (d) 0–8% by weight of conventional additives, characterized in that the ethylene copolymer (a) is an ethylene-methyl (meth)-acrylate copolymer.

The present invention further provides a method of producing an inner cross-linked semiconducting layer of an electric cable including a conductor which, in the order from inside and outwards, is surrounded by an inner semiconducting layer, an insulating layer, and an outer semiconducting layer, said inner semiconducting layer being derived from a cross-linkable, semiconducting composition which, based on the total weight of the composition, comprises (a) 30–90% by weight of an ethylene copolymer, (b) carbon black in an amount at least sufficient to make the composition semiconducting, (c) 0.2–8% by weight of a peroxide cross-linking agent, (d) 0–8% by weight of conventional additives, characterized in that the cross-linkable semiconducting composition contains an ethylene-methyl (meth)acrylate copolymer as the ethylene copolymer (a), and that the composition is cross-linked at a temperature of 300–400° C.

Further characterising features and advantages of the present invention will appear from the following description and the appended claims.

DETAILED DESCRIPTION OF THE INVENTION

As mentioned above, the semiconducting composition according to the present invention differs from prior semiconducting EVA-containing compositions in that it does not generate any acetic acid at elevated temperatures. This is an important advantage, because it means that corrosion of the equipment when processing the composition will be greatly reduced or eliminated. Accordingly, it is not necessary to use expensive, highly corrosion-resistant materials for the equipment. Further the absence of generation of obnoxious acetic acid means a substantial improvement of the working environment at plants producing the semiconducting composition and electric cables containing the same.

Another important advantage of the present invention is the thermal stability of the ethylene-methyl (meth)-acrylate copolymer and, consequently, of the composition containing the same. This thermal stability means that the composition can be heated to higher temperatures, e.g. during compounding and cross-linking (vulcanization) than other known compositions such as EVA without any risk of the composition decomposing. When the temperature of the composition is increased, its viscosity is reduced and the reduced viscosity means that the energy required to compound the composition is reduced too, i.e. a greater amount of composition can be compounded with the same amount of energy compared to conventional compositions. This fact may be used to advantage in two ways, namely either the same amount of composition may be compounded during the same period of time with a smaller amount of energy, or a greater amount of composition may be compounded during the same period of time with the same amount of energy, i.e. the productivity is increased. In both instances the present invention leads to a more economical and cost-saving processing of the composition.

As an illustration of the above EVA is compounded at a temperature of about 175–180° C., while EMA and EMMA may be compounded at an about 25° C. higher temperature thanks to their superior resistance to thermo-oxidative degradation. This means that the processing "window" is much wider for EMA and EMMA than for EVA and also that the productivity may be increased for EMA and EMMA compared to EVA.

As a further illustration, prior art EVA compositions are cross-linked at about 260–300° C., preferably about 270–285° C., and temperatures above about 300° C. are not used because of excessive acetic acid generation. In comparison, the EMA- or EMMA-containing composition of the invention may be cross-linked at temperatures up to about 400° C., preferably up to about 390° C. without inconvenience. Although, like for the known EVA compositions, the lower cross-linking temperature limit of EMA and EMMA is about 260° C., it is a specific aspect of the present invention to cross-link the EMA- or EMMA-containing composition at more elevated temperatures of about 300–400° C., preferably about 360–390° C.

This higher cross-linking temperature results in a more rapid cross-linking which in turn makes a higher line speed possible in the cable production. Thus, the line speed when producing a cable with a cross-linked inner semiconducting EMA- or EMMA-containing layer according to the present invention may be increased by 10–30% compared to the line speed of a comparable cable at with a cross-linked inner semiconducting EVA-containing layer.

The circumstance that the temperature, when cross-linking EMA or EMMA, may be as much as about 100° C. higher than when cross-linking EVA considering that, when compounding EMA or EMMA, the temperature advantage to EVA is "only" about 25° C., may be explained by the fact that cross-linking is carried out in an essentially non-oxidizing atmosphere, whereas oxygen is to some extent present during compounding, especially in connection with production stops. Thus, any degradation during cross-linking is of an essentially thermal nature, whereas it is of a thermo-oxidative nature during compounding.

As is evident from the above, is EM(M)A has several important and non-obvious advantages compared to EVA as the copolymer for the inner semiconducting layer of an electric cable.

The semiconducting EM(M)A-composition according to the present invention also presents substantial advantages in comparison with other ethylene-alkyl acrylate copolymers such as EEA and EBA which, as indicated above, generally are not used as polymers for inner semiconducting layers.

As mentioned earlier, EEA and EBA do not exhibit the very high thermal stability of EM(M)A. Thus, while EM(M)A is stable and may be cross-linked at temperatures up to about 400° C., EEA and EBA have a poorer stability and have a maximum cross-linking temperature that is about 10–20° C. lower. Moreover, EEA and EBA split off decomposition products when processed at high temperatures (above 280° C.) and as mentioned earlier, these decomposition products may give rise to undesired water-treeing.

Another advantage of the EM(M)A composition of the present invention when used as the inner semi-conducting layer of a cable is that it has excellent adhesion to the metallic conductor as opposed to EEA and EBA which show substantial shrink-back. A sufficient increase of the polymer-metal adhesion to eliminate the shrink-back problem would require such high amounts of EA and BA, respectively, in the polymer as to unacceptably lower the mechanical properties of the EEA and EBA containing semiconducting compositions.

To sum up, for use in inner semiconducting layers, preferably cross-linked inner semiconducting layers of electric cables, the EM(M)A-containing composition according to the present invention shows substantial and decisive advantages.

As stated earlier, the semiconducting composition of the invention comprises as a component (a) 30–90% by weight an ethylene-methyl (meth)acrylate copolymer, based on the total weight of the composition. Preferably the composition comprises 55–90% by weight of the ethylene-methyl (meth) acrylate copolymer. The amount of methyl (meth)acrylate commoner in the ethylene-methyl (meth)acrylate copolymer is preferably 5–25% by weight, more preferably 10–20% by weight, based on the copolymer. When the amounts of the methyl (meth)acrylate commoner and of the copolymer lie within the ranges stated, optimum performance can be achieved for the inner semiconducting layer.

In order to make the composition semiconducting, it includes carbon black as a component (b). The amount of carbon black is not critical, but should of course be at least sufficient to make the composition semiconducting. Preferably the composition contains 15–45% by weight of carbon black, more preferably 30–40% by weight, based on the total weight of the composition. Any carbon black can be used provided it is electrically conductive. Examples of suitable carbon blacks include furnace blacks and acetylene blacks.

The composition of the invention preferably is cross-linkable and includes a peroxide cross-linking agent as a component (c). The amount of the peroxide cross-linking agent is 0.2–8% by weight, preferably 0.6–2% by weight. Examples of suitable cross-linking agents include organic peroxides such as dicumyl peroxide, bis(t-butylperoxy) diisopropylbenzene, and 2,5-dimethyl-2, 5-di (t-butylperoxy) hexyne-3.

In addition to the above components, the semiconducting composition of the present invention may also as a component (d) comprise up to about 8% by weight, preferably up to about 4% by weight, based on the total weight of the composition, of conventional additives, such as processing aids, stabilizers, antioxidants, scorch retardants, water-tree-retarding (WTR)additives, fillers and lubricants.

Having thus explained the present invention, it will now be elucidated by way of a non-limiting example.

EXAMPLE 1

In order to show the advantage of EMA and EMMA compared to EVA, EEA and EBA with respect to thermal stability, the following test was made.

Samples of EMA (5.7 mole % MA); EMMA (4.9 mole %); EVA (6.7 mole % VA); EEA (4.8 mole % EA); and EBA (4.3 mole % BA) were subjected to thermogravimetric analysis (TGA) at 333° C. (isothermal). The weight loss of each sample in % was determined at 20 min intervals. The results appear in Table 1.

TABLE 1

| | Time (min) | | | | |
|---|---|---|---|---|---|
| | 20 | 40 | 60 | 80 | 100 |
| EMA | 0.8 | 1.3 | 1.8 | 2.2 | 2,6 |
| EMMA | 1.1 | 1.5 | 1.9 | 2,3 | 2.7 |
| EVA | 12 | 12.7 | — | — | — |
| EEA | 1.2 | 1.9 | 2.5 | 3.2 | 3.7 |
| EBA | 1.3 | 2.2 | 2.9 | 3.6 | 4.3 |

It is evident from Table 1 that EVA shows very high weight loss due to decomposition. Also EEA and EBA show a considerable weight loss which is nearly twice as high as that of EMA and EMMA after 100 min. As explained above, EMA and EMMA do not split off any decomposition products like ethylene or butene, and the weight loss of EMA and EMMA may instead be explained by chain cleavage.

What is claimed is:

1. A semiconducting inner layer of an electric cable, said inner layer being derived from a semiconducting composition which, based on the total weight of the composition, consists essentially of:
    (a) 30–90% by weight of an ethylene-methyl acrylate copolymer,
    (b) an amount of carbon black sufficient to make the composition semiconducting,
    (c) 0–8% by weight of a peroxide cross-linking agent, and
    (d) 0–8% by weight of conventional additives.

2. The semiconducting layer of claim 1, wherein the ethylene-methyl acrylate copolymer includes 5–25% by weight of methyl acrylate, based on the weight of the copolymer.

3. The semiconducting layer of claim 1, wherein the composition contains 15–45% by weight of carbon black, based on the weight of the composition, as the component (b).

4. The semiconducting layer of claim 1, wherein the composition contains 0.2–2% by weight of peroxide cross-linking agent, as the component (c).

5. An electric cable including a central conductor which, in sequence, is surrounded by an inner semiconducting layer, an insulating layer, and an outer semiconducting layer, said inner semiconducting layer being derived from a semiconducting composition which, based on the total weight of the composition, consists essentially of:
    (a) 30–90% by weight of an ethylene-methyl acrylate copolymer,
    (b) an amount of carbon black sufficient to make the composition semiconducting,
    (c) 0–8% by weight of a peroxide cross-inking agent, and
    (d) 0–8% by weight of conventional additives.

6. The electric cable of claim 5, wherein the ethylene-methyl acrylate copolymer (a) contains 5–25% by weight of methyl acrylate, based on the weight of the copolymer.

7. A method of producing an inner cross-linked, semiconducting layer of an electric cable including a central conductor which, in sequence, is surrounded by an inner semiconducting layer, an insulating layer, and an outer semiconducting layer, said inner semiconducting layer being derived from a semiconducting composition which, based on the total weight of the composition, consists essentially of:
    (a) 30–90% by weight of an ethylene-methyl acrylate copolymer,
    (b) an amount of carbon black sufficient to make the composition semiconducting,
    (c) 0.2–8% by weight of a peroxide cross-linking agent, and
    (d) 0–8% by weight of conventional additives,
wherein the composition is cross-linked at a temperature of 300–400° C.

* * * * *